Aug. 18, 1970     H. R. PERSON     3,525,065
HEAT DISSIPATING RESISTOR
Original Filed Feb. 2, 1967     3 Sheets-Sheet 1
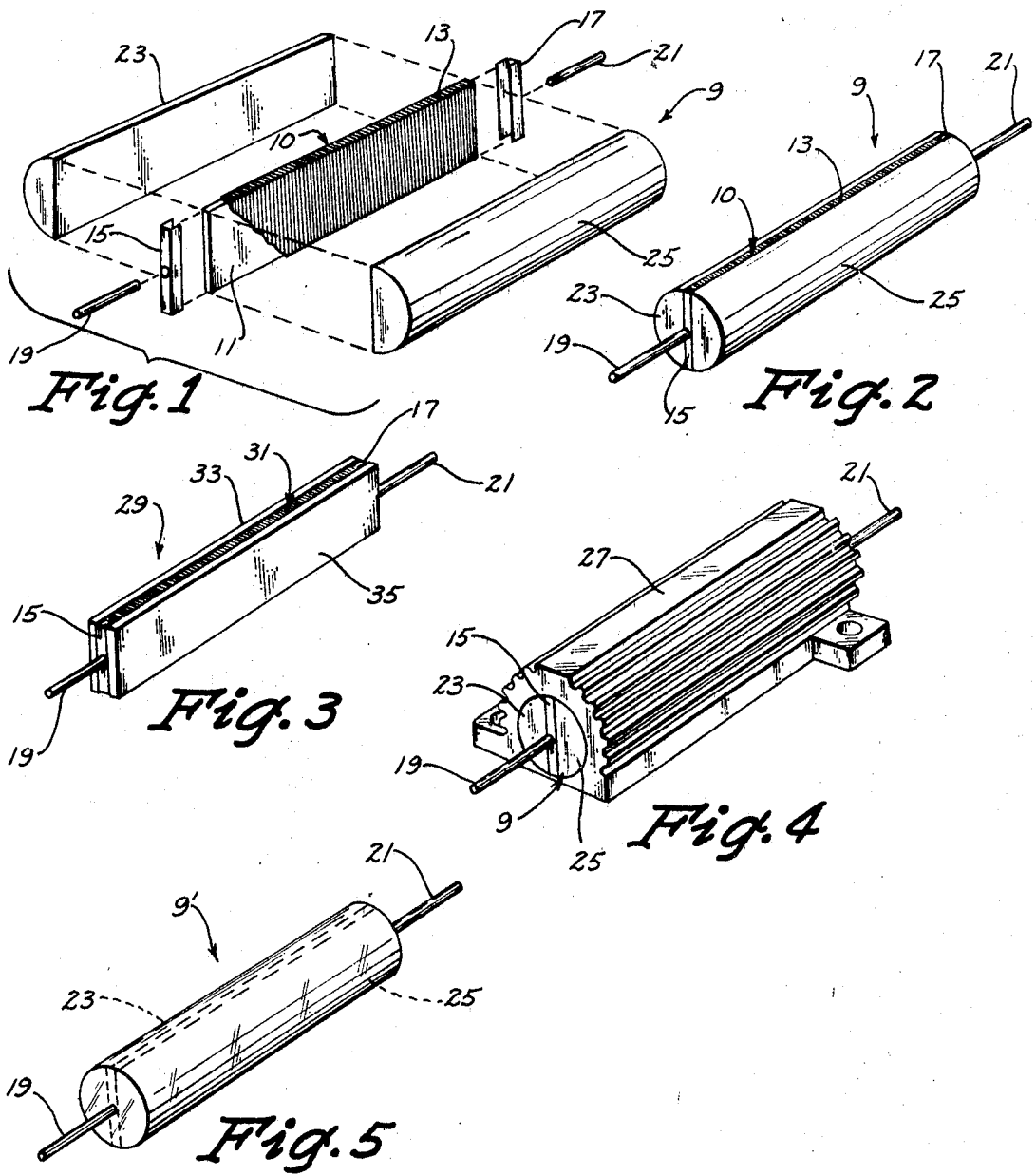
INVENTOR
HERMAN R. PERSON
BY
*Zarley, McKee & Thomte*
ATTORNEYS Aug. 18, 1970  H. R. PERSON  3,525,065
HEAT DISSIPATING RESISTOR
Original Filed Feb. 2, 1967  3 Sheets-Sheet 2
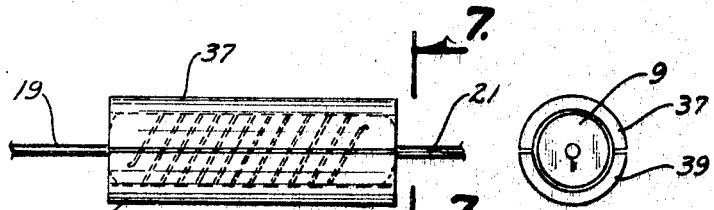
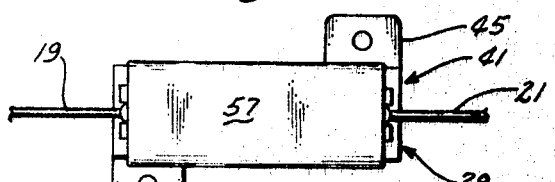
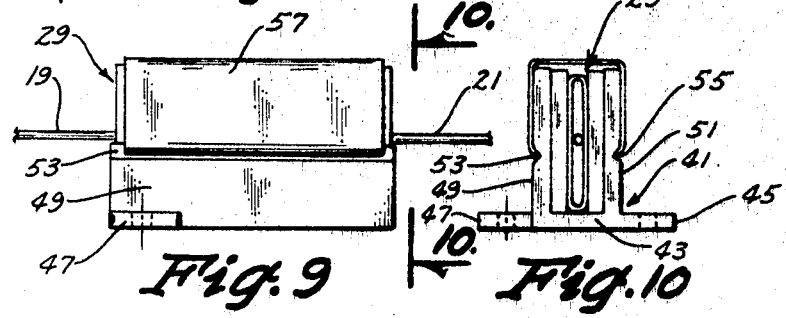
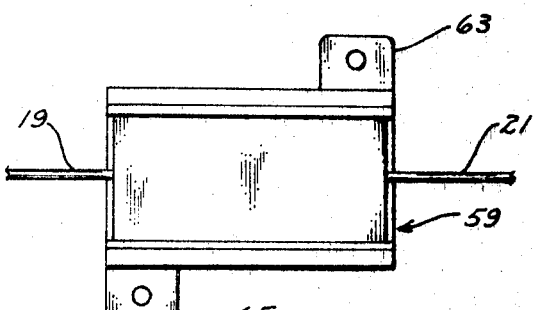
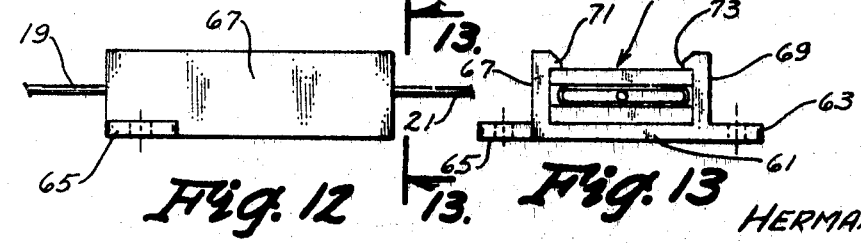
INVENTOR
HERMAN R. PERSON
BY
Dick, Zorley, McKee & Thomte
ATTORNEYS Aug. 18, 1970          H. R. PERSON          3,525,065
HEAT DISSIPATING RESISTOR
Original Filed Feb. 2, 1967          3 Sheets-Sheet 3
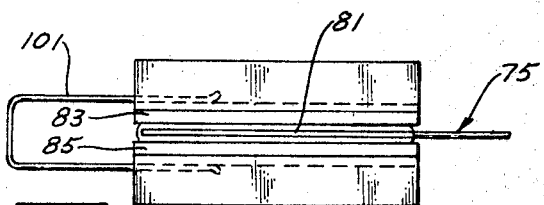
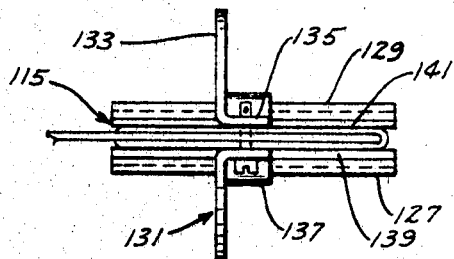
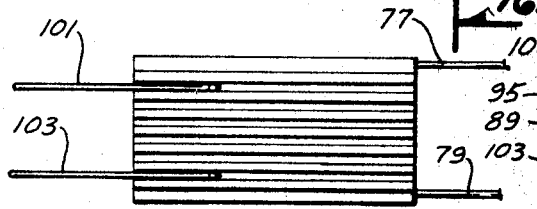
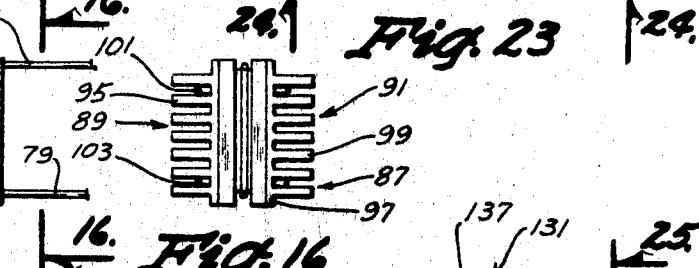
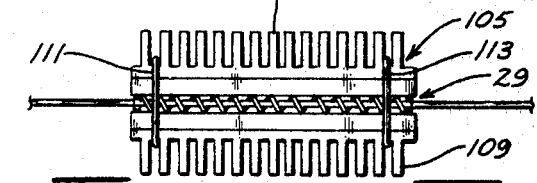
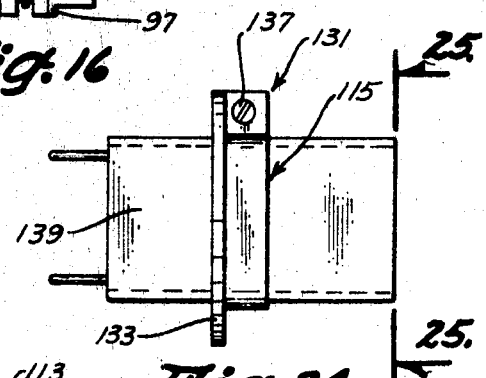
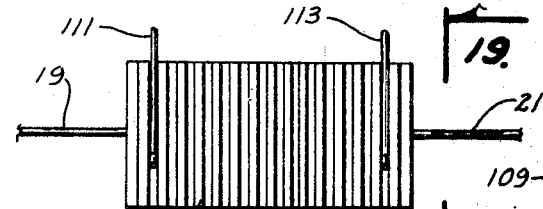
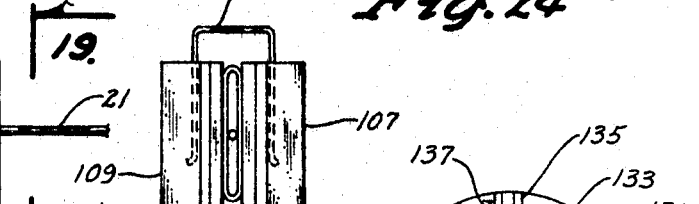
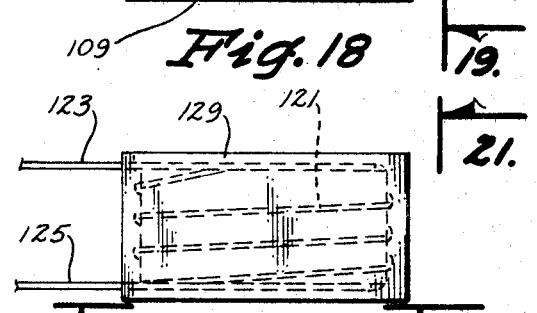
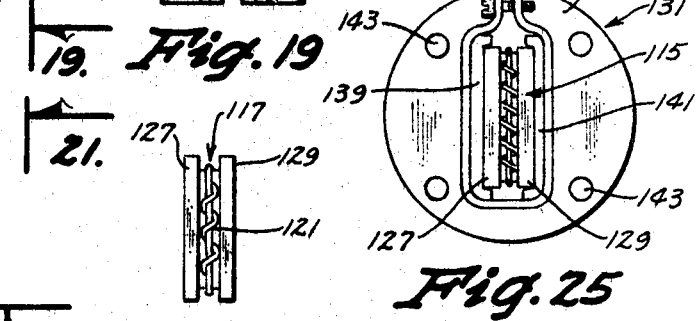
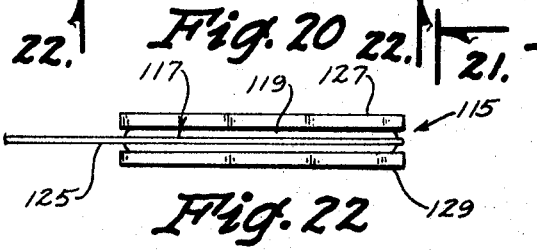
INVENTOR
HERMAN R. PERSON
BY
Dick, Zarley, McKee & Thomte
ATTORNEYS

United States Patent Office 3,525,065
Patented Aug. 18, 1970

3,525,065
HEAT DISSIPATING RESISTOR
Herman R. Person, Columbus, Nebr., assignor to Dale Electronics, Inc., Columbus, Nebr., a corporation of Nebraska
Continuation of application Ser. No. 614,833, Feb. 2, 1967. This application Feb. 3, 1969, Ser. No. 810,898
Int. Cl. H01c 1/02
U.S. Cl. 338—243         8 Claims

ABSTRACT OF THE DISCLOSURE

A resistor including a resistance means having opposite sides and ends. First and second insulative heat conductor elements are secured on opposite sides of the resistance means. First and second lead elements are secured to opposite ends of the resistance means and extend therefrom. The resistance means is comprised of a resistance element which is wound or deposited on a substrate sandwiched between the insulative heat conductor elements.

---

This is a continuation of application Ser. No. 614,833 filed Feb. 2, 1967, and now abandoned.

Resistors available on the market today often require expensive steps of fabrication, including different "potting" techniques. In addition, these resistors do not have the ability to quickly dissipate heat which adversely affects their load life and their performance capabilities.

Therefore, it is a principal object of this invention to provide a low reactance, high heat dissipating resistor.

A further object of this invention is to provide a resistor which has a high power dissipation to space ratio.

A further object of this invention is to provide a resistor which prevents heating of the leads thereby preventing melting of the solder which is used to make the connection to their resistors.

A further object of this invention is to provide a resistor which lends itself to many different types of mounting or encapsulating techniques.

A further object of this invention is to provide a resistor which permits many types of terminations or lead types.

A further object of this invention is to provide a resistor which may be used with many types of resistance elements.

A further object of this invention is to provide a resistor which allowes for many types of resistors to be made using the same parts thereby permitting a reduction in the stock inventory which is necessary to maintain production.

A further object of this invention is to provide a resistor which has a very low inductance.

A further object of this invention is to provide a resistor having a design which allows mass production techniques.

A further object of this invention is to provide a resistor which substantially eliminates dielectric test failures.

A further object of this invention is to provide a resistor which is economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an exploded perspective view of the resistor with portions thereof cut away to more fully illustrate the invention;

FIG. 2 is a perspective view of the assembled resistor;

FIG. 3 is a perspective view of a modified form of the resistor;

FIG. 4 is a perspective view illustrating the resistor of FIG. 2 mounted in a metal housing;

FIG. 5 is a perspective view of a resistor similar to that seen in FIG. 2, the only difference being that the resistor in this figure is encapsulated by a coating which has been placed thereon by molding, dipping or painting;

FIG. 6 is a plan view of a modified form of the resistor;

FIG. 7 is an end view of the resistor of FIG. 6;

FIG. 8 is a top view of a modified form of the resistor;

FIG. 9 is a side view of the resistor of FIG. 8;

FIG. 10 is an end view of the resistor of FIG. 9 as would be seen on line 10—10 of FIG. 9;

FIG. 11 is a top view of a modified form of the resistor;

FIG. 12 is a side view of the resistor of FIG. 11 as would be seen on line 12—12 of FIG. 11;

FIG. 13 is an end view as would be seen on line 13—13 of FIG. 12;

FIG. 14 is a top view of a modified form of the resistor with the retaining spring partially removed therefrom;

FIG. 15 is a view as would be seen on line 15—15 of FIG. 14;

FIG. 16 is a view as would be seen on line 16—16 of FIG. 15;

FIG. 17 is a top view of a modified form of the resistor;

FIG. 18 is a view as would be seen on line 18—18 of FIG. 17 and which illustrates the retaining springs partially removed therefrom;

FIG. 19 is a view as would be seen on line 19—19 of FIG. 18;

FIG. 20 is a top elevational view of a modified form of the resistor;

FIG. 21 is a view as would be seen on line 21—21 of FIG. 20;

FIG. 22 is a view as would be seen on line 22—22 of FIG. 20;

FIG. 23 is a side view of a modified form of the resistor;

FIG. 24 is a view as would be seen on line 24—24 of FIG. 23; and

FIG. 25 is a view as would be seen on line 25—25 of FIG. 24.

The numeral 9 in FIGS. 1 and 2 generally designates an embodiment of the resistor of this invention. Resistor 9 includes a resistance element 10 comprised of a thin, flat card 11 of mica or the like which is wound with a resistance wire 13. Channel-shaped terminal clips 15 and 17 are mounted on opposite ends of card 13 and embrace the card and the wire 13. The terminal clips can be secured to the cards in any convenient fashion, such as by crimping or by an electro-conducting adhesive. Leads 19 and 21 are welded to terminations 15 and 17 respectively and extend therefrom. As seen in FIG. 2, card 11 is sandwiched between insulative heat conductors 23 and 25 which are semicircular in cross-section. Heat conductors 23 and 25 are constructed of beryllium oxide or boron nitride which have high heat dissipating characteristics. Beryllium oxide is preferred over boron nitride because of the comparative costs thereof. The elements 23 and 25 are of pre-cast construction. Heat conductors 23 and 25 are secured to resistance element 10 by a suitable varnish or resin material. Resistance element 10 can alternatively be comprised of a thin, flat ceramic substrate having a resistive film thereon, or it could be comprised of a resistance element stamped or etched out of a flat sheet of resistance alloy. The resistance means can also alternatively be comprised of a resistance film on one of the opposing surfaces of the heat conductors. The resistor 9 can be used in a variety of different mountings such as the metal housing 27 seen in FIG. 4 in which the resistor has been secured by a suitable adhesive. Also, the resistor can be coated with a suitable insulative coating material by dipping, molding or painting. FIG. 5 illustrates a resistor 9' which has been so coated.

Resistor 9 can also be inserted into various types of metal clips or clamps for use in a circuit. When the resistor is placed into a metal clip or clamp and put on a chassis, it will have a power dissipation to space ratio which is extremely high.

Another embodiment is seen in FIG. 3 wherein the numeral 29 generally designates the resistor. Resistor 29 is similar to resistor 9 with one exception. The resistance element 31 is sandwiched between two thin, flat sheets 33 and 35 of beryllium oxide or boron nitride rather than the half-round configuration of heat conductors 23 and 25 of FIG. 1. Resistance element 31 also has terminal clips 15 and 17 secured to its opposite ends which have leads 19 and 21, respectively, extending therefrom. Resistor 29 can also be coated or used in various metal clips or clamps as discussed above in the description of resistor 9.

FIGS. 6 and 7 illustrate another embodiment of the resistor of this invention. A resistor 9 which is illustrated in FIGS. 1 and 2 in the drawings and which is described above in detail is provided with a pair of housing members 37 and 39 applied intimately to the outside of the resistor 9. If desired, housing members 37 and 39 could be replaced by a single hollow cylinder housing extending around the resistor 9. Housing members 37 and 39 are constructed of beryllium oxide to achieve the maximum heat conduction from the resistor.

FIGS. 8, 9 and 10 illustrate a housing configuration which is ideally suited for use with the resistor 29 which was previously described above and which is illustrated in FIG. 3 in the drawings. In FIGS. 8 and 10, the resistor 29 is removably mounted in a metal housing 41. Housing 41 is comprised of a base portion 43 having a pair of tabs 45 and 47 extending laterally therefrom which are provided with openings formed therein to facilitate the mounting of the housing 41 to a chassis. Housing 41 is also provided with a pair of upstanding, spaced apart wall members 49 and 51 which are provided with horizontal grooves 53 and 55 formed therein respectively. Resistor 29 is simply positioned between the upstanding wall members 49 and 51 so that the leads 19 and 21 extend from opposite ends thereof. Resistor 29 is maintained in housing 41 by means of holding spring clamp 57 which is substantially U-shaped. Clamp 57 extends over the upper ends of wall members 49 and 51 as seen in FIG. 10 and has its lower edges received by grooves 53 and 55 to prevent the clamp from becoming inadvertently detached from the housing 41. The resiliency of the clamp 57 prevents movement of resistor 29 with respect to the housing 41.

FIGS. 11, 12 and 13 illustrate another housing configuration which is adapted to receive a resistor 29 and which is generally indicated by the reference numeral 59. Housing 59 is of metal construction and includes a base portion 61 having a pair of tabs 63 and 65 extending laterally therefrom to facilitate the attachment of housing 59 to a chassis or the like. Housing 59 is provided with a pair of upstanding wall members 67 and 69 which are provided with shoulder portions 71 and 73 adjacent the upper inner ends thereof respectively. Resistor 29 is mounted in housing 59 by simply positioning housing 29 between wall members 67 and 69 so that shoulders 71 and 73 engage the upper end of resistor 29 as best illustrated in FIG. 13 thereby preventing any movement of resistor 29 with respect to housing 59. Resistor 29 may be mounted in housing 59 by simply deflecting wall members 67 and 69 outwardly to facilitate the insertion of resistor 29 or the resistor may be slidably moved between wall members 67 and 69 from one end of the housing 59.

FIGS. 14, 15 and 16 illustrate another resistor configuration and a housing for mounting the same therein. In FIGS. 14–16, the numeral 75 generally designates the resistor which is generally similar to resistor 29 except that the leads 77 and 79 extend from the resistance element 81 in a parallel manner as illustrated in FIGS. 14–16. The resistance element 81 is sandwiched between two thin, flat sheets 83 and 85 of beryllium oxide or boron nitride. The resistor 75 is mounted in a housing 87 which is comprised of identical housing members 89 and 91. Housing member 89 is comprised of a base portion 93 having a plurality of spaced apart fins 95 extending therefrom. Housing member 91 is comprised of a base portion 97 having a plurality of spaced apart fins 99 extending therefrom. Housing members 87 and 89 are positioned adjacent resistor 75 so that the base portions thereof engage the exterior surfaces of the sheets 83 and 85 for intimate contact therebetween. Housing members 87 and 89 are maintained in the position seen in FIGS. 14–16 by means of a pair of holding spring clamps 101 and 103 which are shown in a partially removed condition in FIGS. 14 and 15. Each of the clamps are U-shaped and the leg portions thereof are received between adjacent fins on each of the housing members as illustrated in FIG. 16 to maintain resistor 75 within housing 87.

FIGS. 17–19 illustrate a resistor 29 mounted in a housing 105 which is comprised of housing members 107 and 109. Housing 105 is substantially identical to housing 87 seen in FIGS. 14–16. Resistor 29 is maintained between housing members 107 and 109 by means of holding spring clamps 111 and 113 in the manner best illustrated in FIGS. 17 and 18. The holding spring clamps 111 and 113 are shown in a partially removed condition in FIGS. 18 and 19 for purposes of clarity only. The configuration of FIGS. 17–19 is substantially identical to the configuration of FIGS. 14–16 except that the leads of the resistor 29 extend outwardly of the opposite ends of the housing rather than that which is seen in FIG. 15.

FIGS. 20–22 illustrate still another embodiment of the resistor of this invention. In FIGS. 20–22 the resistor is generally designated by the reference numeral 115 and includes a resistance element 117 comprised of a thin, flat card 119 of mica or the like which is wound with a resistance wire 121. Leads 123 and 125 are electrically connected to the opposite of resistance wire 121 by any suitable means or by means described herein. The resistance element 117 is sandwiched between two thin, flat sheets 127 and 129 of beryllium oxide. Sheets 127 and 129 are in intimate contact with the resistance element and these sheets are maintained in this intimate contact in a fashion similar to that explained in the description of the resistor 29. The main difference between resistor 29 and the resistors seen in FIGS. 20–22 is the fact that leads 123 and 125 extend from the resistor in a parallel fashion rather than from opposite ends thereof in the resistor 29.

FIGS. 23–25 illustrate still another resistor embodiment and in these figures, the numeral 131 generally designates a mounting bracket which includes a plate portion 133 and a clamp portion 135 which is adapted to be opened or closed by means of threaded member 137. Bracket 131 is ideally suited for securing a resistor 115 to a chassis or the like. As seen in FIG. 25, resistor 115 is simply positioned in the mounting bracket 131 so that its opposite ends extend therefrom as seen in FIGS. 23 and 24. If desired, a pair of beryllium oxide sheets 139 and 141 may be positioned in the bracket so as to embrace resistor 115 in the manner best seen in FIG. 25. As seen in FIG. 25, sheets 139 and 141 are substantially channel-shaped so that the ends thereof extend slightly around the upper and lower edges of the sheets 127 and 139 to limit the movement therebetween. Mounting bracket 131 and the resistor 129 secured thereto may be conveniently attached to a chassis or the like by simply extending suitable fastening members through the openings 143 provided in plate 133. Although FIGS. 23–25 illustrate a resistor 115 mounted therein, it is obvious that a resistor 29 could also be mounted therein.

The resistors seen in FIGS. 1 and 3 lend themselves to be used with many different types of terminations or leads for any desired terminal or lead construction can be secured to the clips 15. The leads seen in FIGS. 1 and 3 are merely for purposes of illustration and are not intended to limit the lead configuration. Some of the other lead configuration is seen in FIGS. 6-25. Additionally, the configuration of the resistors of this invention permits many types of resistors to be manufactured using the same parts which permits a reduction in the stock inventory which is necessary to maintain production. As stated above, the configuration of the resistors of this invention permits many types of resistance elements to be used in conjunction herewith. The design of the resistors of this invention lend themselves to be used in various types of mountings or encapsulating techniques as is evidenced by the various types of housings illustrated in the drawings and the various encapsultating techniques.

The resistors described herein have a low reactance with high powered dissipation qualities. The design of these resistors prevents the leads from becoming heated in use thereby preventing the melting of the solder which is commonly used to make the lead connection to the resistor. The heat build up in the center of the resistor is greatly dissipated by the heat conductors (the beryllium oxide sheets which are in intimate contact with the resistance element) which quickly permit the heat to move to the ends thereof to be dissipated to the atmosphere or to a chassis. Additionally, the shape of the resistance element inherently has a very low inductance which gives the resistor very high frequency characteristics thereby permitting the resistor to be used in many more types of circuits.

The configuration of these resistors also allows for mass production techniques to be used in winding the resistor since the wire wound element is wound on a mica card that can be purchased in a very long sheet which would permit the resistance element to be continuously wound. The film and the etched resistance element discussed above could also be produced in a very long strip form and then punched or etched to the correct resistance value automatically. Dielectric test failures are practically reduced to zero and these resistors inasmuch as the beryllium oxide would have to break down for a failure to occur which would require 5,000 v. AC or more. Additionally, the cost of these resistors would be less than resistors presently available which are rated at the same power dissipation. Since the heat conducting elements 23 and 25 are of pre-cast construction, the expensive "potting" operation of conventional resistors is avoided. The flat construction of the heat conducting elements such as seen in FIGS. 3, 8-25 is the preferred configuration. The reason that the flat beryllium oxide heat conductor configuration is desired is from an economic viewpoint inasmuch as the resistor of FIGS. 1, 2, 5 and 6 will necessarily require more beryllium oxide thereby increasing the cost thereof.

It should be pointed out that the beryllium oxide sheets are in intimate contact with the resistance wire to achieve the greatest heat conduction from the resistor. It should be emphasized that the various housings described in the drawings are not an essential element in the efficiency of this concept but are only elemental in providing a method for retention of the beryllium oxide sheets to the resistance element, providing a means for attachment to a chassis, or in aiding the conduction of heat from the beryllium oxide to the chassis where it is not practical to have the device directly attached to a chassis.

Thus it can be seen that the resistor accomplishes at least all of its stated objectives.

I claim:
1. In a resistor,
a resistance means having opposite flat sides, surfaces, opposite edges, and opposite ends,
single heat dissipating elements secured on opposite sides of said resistance means,
said heat dissipating elements being comprised of a single electrically insulative material,
said heat dissipating elements having high heat conductance characteristics,
said heat dissipating elements being in contact only with said opposite flat sides of said resistance means along the entire length thereof so that said first and second elements will dissipate the heat generated by said resistance means,
means between said resistance means and said heat dissipating elements securing said heat dissipating elements to opposite sides of said resistance means,
a first lead element secured to said resistance means at one end thereof,
and a second lead element secured to said resistance means at the other end thereof.

2. The resistor of claim 1 wherein said resistance means is comprised of a flat rectangular sheet having a resistance element thereon and wherein said heat dissipating elements are comprised of beryllium oxide.

3. The resistor of claim 2 wherein said heat dissipating elements are ocmprised of flat rectangular sheet elements having substantially the same length and width as said flat rectangular sheet.

4. The resistor of claim 3 wherein a rigid metal housing embraces said heat dissipating elements so that said heat dissipating elements can dissipate heat to said housing.

5. The resistor of claim 4 wherein said housing is comprised of a flat base portion having spaced apart upstanding wall members extending therefrom transverse to the plane of said base portion, said housing having opposite open ends through which said first and second lead elements extend, respectively, said base portion having at least one mounting tab extending laterally therefrom.

6. The resistor of claim 5 wherein said wall members have shoulder portions provided thereon adjacent the free ends thereof, said shoulder portions engaging at least one of said heat dissipating elements to maintain said components between said wall members.

7. The resistor of claim 1 wherein said resistance means is comprised of a flat sheet member having a resistance film thereon.

8. The resistor of claim 1 wherein said resistance means is comprised of a flat rectangular sheet having a resistance element secured thereon by means of terminal clips.

References Cited

UNITED STATES PATENTS

| | | | |
|---|---|---|---|
| 1,065,037 | 6/1913 | Falkenburg | 338—232 |
| 1,089,884 | 3/1914 | Vollbrecht | 338—254 |
| 1,913,355 | 6/1933 | Wiegand | 338—238 |
| 2,976,387 | 3/1961 | Browne | 338—293 |
| 2,999,994 | 9/1961 | Bourns | 338—232 |
| 3,238,489 | 3/1966 | Hay | 174—15 |
| 3,261,904 | 7/1966 | Wulc. | |

OTHER REFERENCES

Dunmer: Fixed Resistors, Pitman, London, 1956, p. 94 relied on.

ELLIOT A. GOLDBERG, Primary Examiner

U.S. Cl. X.R.

338—254, 230, 293, 308